US010568012B2

(12) United States Patent
Wu (10) Patent No.: US 10,568,012 B2
(45) Date of Patent: Feb. 18, 2020

(54) DEVICE AND METHOD OF HANDLING MOBILITY MANAGEMENT

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 104 days.

(21) Appl. No.: 15/473,589

(22) Filed: Mar. 29, 2017

(65) Prior Publication Data

US 2017/0295528 A1 Oct. 12, 2017

Related U.S. Application Data

(60) Provisional application No. 62/319,805, filed on Apr. 8, 2016.

(51) Int. Cl.
*H04W 36/14* (2009.01)
*H04W 76/10* (2018.01)
*H04W 76/00* (2018.01)
*H04W 4/70* (2018.01)

(52) U.S. Cl.
CPC .......... *H04W 36/14* (2013.01); *H04W 76/00* (2013.01); *H04W 76/10* (2018.02); *H04W 4/70* (2018.02)

(58) Field of Classification Search
CPC ..... H04W 60/04; H04W 60/00; H04W 36/14; H04W 76/10; H04W 4/70
See application file for complete search history.

(56) References Cited

U.S. PATENT DOCUMENTS

| 2015/0071169 | A1 | 3/2015 | Wang | |
| 2015/0257115 | A1* | 9/2015 | Jokimies | H04W 60/04 455/435.1 |
| 2015/0289224 | A1 | 10/2015 | Kabadi | |

FOREIGN PATENT DOCUMENTS

| CN | 102083155 A | 6/2011 | |
| CN | 102316521 A | 1/2012 | |
| CN | 102595373 A | 7/2012 | |
| CN | 105122911 A | 12/2015 | |
| EP | 2568761 A1 | 3/2013 | |
| EP | 2713664 A1 | 4/2014 | |
| WO | 2015/163712 A1 | 10/2015 | |
| WO | WO-2017139130 A1 * | 8/2017 | H04W 60/00 |

OTHER PUBLICATIONS

Search Report dated Aug. 29, 2017 for EP application No. 17164477.6, pp. 1-13.

(Continued)

*Primary Examiner* — Vinncelas Louis
(74) *Attorney, Agent, or Firm* — Winston Hsu (57) ABSTRACT

A communication device for handling mobility management includes a storage unit for storing instructions and a processing circuit coupled to the storage unit. The processing circuit is configured to execute the instructions stored in the storage unit. The communication device performs attaching to a first network and not having an active Packet Data Network (PDN) connection with the first network; selecting a second network after attaching to the first network; initiating an attach procedure to the second network, if the second network does not support an attach without the PDN connection establishment; and initiating a tracking area update (TAU) procedure to the second network, if the second network supports the attach without the PDN connection establishment.

13 Claims, 6 Drawing Sheets

(56) References Cited

OTHER PUBLICATIONS

Intel, "Proposal for a state model for UEs supporting CIoT features", 3GPP TSG CT WG1 Meeting #96, C1-161110, Feb. 15-19, 2016, Jeju, The Republic of Korea, XP051049594, pp. 1-7.

3GPP CT WG1, "Existence of CIoT support and NAS protocol details for CIoT", 3GPP TSG CT WG1 Meeting 96, TDoc C1-161544, Feb. 15-19, 2016, Jeju (Korea), XP051078077, pp. 1-2.

Office action dated Jul. 2, 2018 for EP application No. 17164477.6, pp. 1-10.

Intel, "Support of EMM-REGISTERED without PDN connectivity", 3GPP TSG-CT1 Meeting #96, C1-161055, Feb. 15, 2016-Feb. 16, 2016, Jeju Island, Korea (Republic of), XP051049543, pp. 1-49.

3GPP TS 24.301 V13.5.0 (Mar. 2016) Technical Specification 3rd Generation Partnership Project; Technical Specification Group Core Network and Terminals; Non-Access-Stratum (NAS) protocol for Evolved Packet System (EPS); Stage 3 (Release 13).

3GPP TS23.401 V13.6.1 (Mar. 2016); Technical Specification; 3rd Generation Partnership Project; Technical Specification Group Services and System Aspects; General Packet Radio Service (GPRS) enhancements for Evolved Universal Terrestrial Radio Access Network; (E-UTRAN) access (Release 13).

3GPP TS 23.060 V13.6.0 (Mar. 2016); Technical Specification; 3rd Generation Partnership Project; Technical Specification Group Services and System Aspects; General Packet Radio Service (GPRS); Service description; Stage 2 (Release 13).

Office action dated May 5, 2019 for the China application No. 201710225120.5, filed Apr. 7, 2017, p. 1-8.

Intel, "Proposal for a state model for UEs supporting CIoT features", 3GPP TSG CT WG1 Meeting #96, C1-161110, Feb. 15-19, 2016, Jeju, The Republic of Korea, pp. 1-7.

3GPP CT WG1, Existence of CIoT support and NAS protocol details for CIoT, 3GPP TSG CT WG1 Meeting 96, SA WG2 Meeting #S2-113AH S2-161092, Sophia Antipolis, France, Feb. 23, 2016.

Office action dated Nov. 26, 2019 for the China application No. 201710225120.5, filing date Apr. 7, 2017, p. 1-10.

Intel, "Support of EMM-Registered without PDN connectivity", 3GPP TSG-CT1 Meeting #96, C1-161055, Feb. 15, 2016-Feb. 19, 2016, Jeju Island, Korea (Republic of) ,pp. 1-49.

\* cited by examiner

| PLMN identity | Tracking area | Support of attach without PDN connection establishment |
|---|---|---|
| PLMN1 | TA1 | Yes |
| PLMN2 | TA5 | No |
| PLMN3 | TA8 | Yes |

FIG. 5

| Support of attach without PDN connection establishment |
|---|
| PLMN1/TA2/TA8 |
| PLMN3 |

DEVICE AND METHOD OF HANDLING MOBILITY MANAGEMENT

CROSS REFERENCE TO RELATED APPLICATIONS

This application claims the benefit of U.S. Provisional Application No. 62/319,805 filed on Apr. 8, 2016, which is incorporated herein by reference.

BACKGROUND OF THE INVENTION

1. Field of the Invention

The present invention relates to a device and a method used in a wireless communication system, and more particularly, to a device and a method of handling mobility management.

2. Description of the Prior Art

A long-term evolution (LTE) system provides high data rate, low latency, packet optimization, and improved system capacity and improved coverage. The LTE system is evolved continuously to increase peak data rate and throughput by using advanced techniques, such as carrier aggregation (CA), dual connectivity, licensed-assisted access, etc. In the LTE system, a radio access network known as an evolved universal terrestrial radio access network (E-UTRAN) includes at least one evolved Node-B (eNB) for communicating with at least one user equipment (UE), and for communicating with a core network. The core network may include a mobility management and a Quality of Service (QoS) control of the at least one UE.

According to operations defined for the LTE system, a UE always performs an attach procedure to a mobility management entity (MME), when the UE moves from a first network to a second network and has no Packet Data Network (PDN) connection in the first network. However, the attach procedure causes a great amount of overheads including extra messages exchanged between the MME and the UE. In other words, cost of mobility management is too high to improve throughput of the LTE system. Therefore, reduction of the overheads for handling mobility management is an important problem to be solved.

SUMMARY OF THE INVENTION

The present invention therefore provides a communication device for handling mobility management to solve the abovementioned problem.

A communication device for handling mobility management comprises a storage unit for storing instructions and a processing circuit, coupled to the storage unit. The processing circuit is configured to execute the instructions stored in the storage unit. The instructions comprise attaching to a first network and not having a Packet Data Network (PDN) connection with the first network; selecting a second network after attaching to the first network; initiating an attach procedure to the second network, if the second network does not support an attach without the PDN connection establishment; and initiating a tracking area update (TAU) procedure to the second network, if the second network supports the attach without the PDN connection establishment.

A communication device for handling mobility management comprises a storage unit for storing instructions and a processing circuit, coupled to the storage unit. The processing circuit is configured to execute the instructions stored in the storage unit. The instructions comprise attaching to a network via a first area of the network and not having a Packet Data Network (PDN) connection with the network; selecting a second area of the network after attaching to the network via the first area; initiating an attach procedure to the network via the second area, if the second area does not support an attach without the PDN connection establishment; and initiating a tracking area update (TAU) procedure to the network via the second area, if the second area supports the attach without the PDN connection establishment.

A first network for handling mobility management comprises a storage unit for storing instructions and a processing circuit, coupled to the storage unit. The processing circuit is configured to execute the instructions stored in the storage unit. The instructions comprise receiving a tracking area update request message from a communication device which moves from a second network to the first network, wherein the communication device does not have a Packet Data Network (PDN) connection with the second network; determining whether the communication device supports attach without a PDN connection establishment; transmitting a tracking area update accept message to the communication device in response to the tracking area update request message when determining that the communication device supports the attach without the PDN connection establishment; and transmitting a tracking area update (TAU) reject message to the communication device in response to the tracking area update request message when determining that the communication device does not support the attach without the PDN connection establishment.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
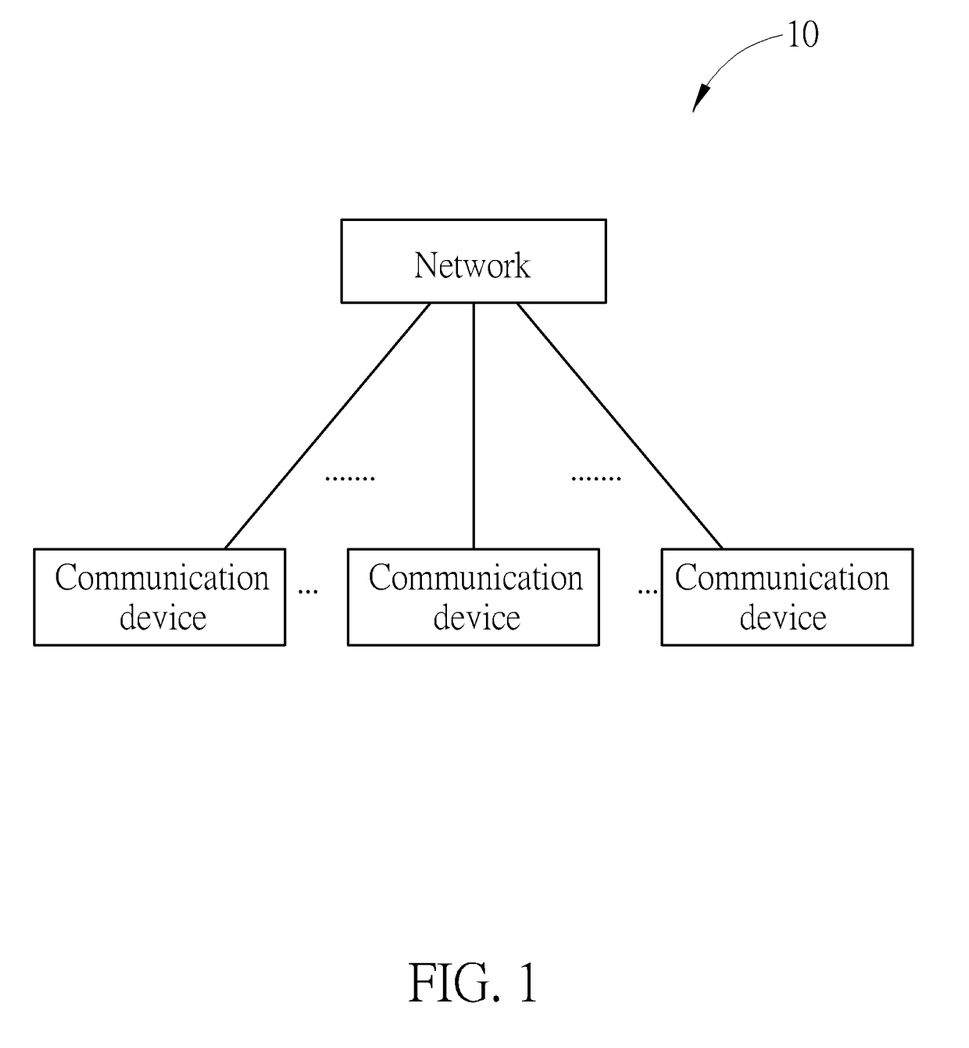
FIG. 1 is a schematic diagram of a wireless communication system according to an example of the present invention.

FIG. 1 is a schematic diagram of a wireless communication system 10 according to an example of the present invention. The wireless communication system 10 is composed of a network and a plurality of communication devices. The network and a communication device may communicate with each other via one or more carriers of licensed band(s) and/or unlicensed band(s).

In FIG. 1, the network and the communication devices are simply utilized for illustrating the structure of the wireless communication system 10. Practically, the network includes a global system for mobile communications (GSM) network, a General Packet Radio Service (GPRS), a Universal Mobile Telecommunications System (UMTS) network, a long-term evolution (LTE) network or a 5G network.

A communication device may be a user equipment (UE), a machine type communication (MTC) device, a mobile phone, a laptop, a tablet computer, an electronic book, a portable computer system, a vehicle, or an aircraft. In addition, the network and the communication device can be seen as a transmitter or a receiver according to direction (i.e., transmission direction), e.g., for an uplink (UL), the communication device is the transmitter and the network is the receiver, and for a downlink (DL), the network is the transmitter and the communication device is the receiver.

Figure 2:
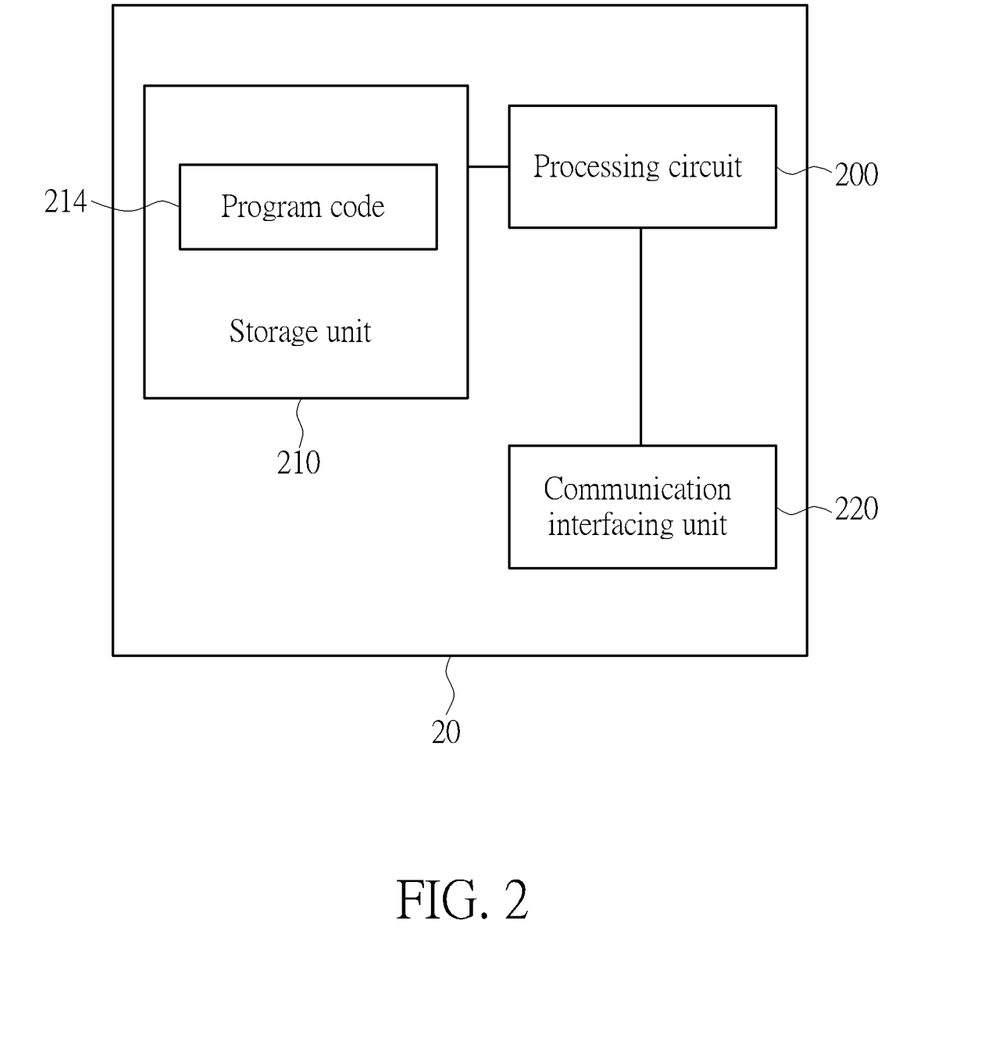
FIG. 2 is a schematic diagram of a communication device according to an example of the present invention.

FIG. 2 is a schematic diagram of a communication device 20 according to an example of the present invention. The communication device 20 may be a communication device or the network shown in FIG. 1, but is not limited herein. The communication device 20 may include a processing circuit 200 such as a microprocessor or Application Specific Integrated Circuit (ASIC), a storage unit 210 and a communication interfacing unit 220. The storage unit 210 may be any data storage device that may store a program code 214, accessed and executed by the processing circuit 200. Examples of the storage unit 210 include but are not limited to a subscriber identity module (SIM), read-only memory (ROM), flash memory, random-access memory (RAM), hard disk, optical data storage device, non-volatile storage unit, non-transitory computer-readable medium (e.g., tangible media), etc. The communication interfacing unit 220 is preferably a transceiver and is used to transmit and receive signals (e.g., data, messages and/or packets) according to processing results of the processing circuit 200.

In the following embodiments, a UE is used to represent a communication device in FIG. 1, to simplify the illustration of the embodiments.

Figure 3:
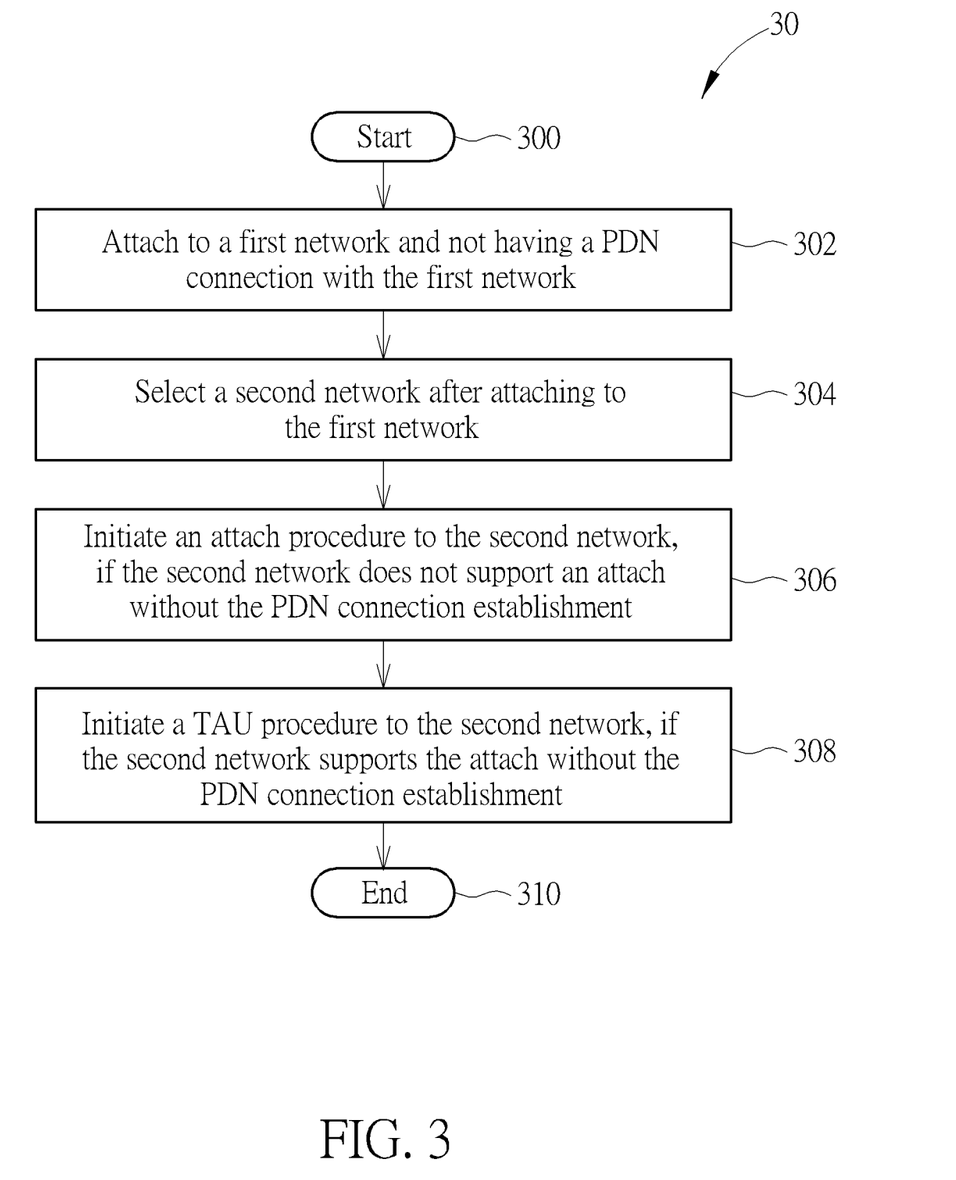
FIG. 3 is a flowchart of a process according to an example of the present invention.

FIG. 3 is a flowchart of a process 30 according to an example of the present invention. The process 30 can be utilized in the UE shown in FIG. 1, for handling mobility management. The process 30 includes the following steps:

Step 300: Start.

Step 302: Attach to a first network and not having a Packet Data Network (PDN) connection with the first network.

Step 304: Select a second network after attaching to the first network.

Step 306: Initiate an attach procedure to the second network, if the second network does not support an attach without the PDN connection establishment.

Step 308: Initiate a tracking area update (TAU) procedure to the second network, if the second network supports the attach without the PDN connection establishment.

Step 310: End.

According to the process 30, the UE first attaches to a first network and does not have a PDN connection with the first network (e.g., the GPRS or UMTS network). After attaching to the first network, the UE selects a second network (e.g., the LTE network). The UE initiates an attach procedure to the second network, if the second network does not support an attach without the PDN connection establishment. The UE initiates a TAU procedure to the second network, if the second network supports the attach without the PDN connection establishment. In other words, the UE determines the attach procedure or the TAU procedure to be initiated according to whether the function of the attach without PDN connection establishment is supported by the second network (i.e., the selected network).

Realization of the process 30 is not limited to the above description. The following examples may be applied to the process 30.

In one example, the first network may be a UMTS network. In one example, the second network may be a LTE network. In one example, the attach without the PDN connection establishment may be an Evolved Packet System (EPS) attach without PDN connectivity. In one example, the first network may be the LTE network, and the second network may be a 5G network. The 5G network may include a 5G base station (BS) and a 5G core network node.

In one example, the second network may indicate to the UE that it supports the attach without the PDN connection establishment in a broadcast signaling or a dedicated signaling. The UE initiates the TAU procedure according to the broadcast signaling or the dedicated signaling. In one example, information related to the second network supporting the attach without the PDN connection establishment is stored in the UE. The UE initiates the TAU procedure according to the information.

An example is illustrated according to the process 30 as follows. The UE attaches to a UMTS or GPRS (UMTS/GPRS) network via a cell of the UMTS/GPRS network by performing a GPRS attach procedure or a routing area update procedure to the UMTS/GPRS network. The UE does not have any PDN connection when staying in the UMTS/GPRS network. Then, the UE selects or reselects a cell of the LTE network. The UE determines whether the LTE network supports an EPS attach without PDN connectivity (e.g., without the PDN connection establishment). If the UE determines that the LTE network supports the EPS attach without PDN connectivity, the UE initiates a TAU procedure to the LTE network by transmitting a TAU request message to the LTE network. If the UE determines that the LTE network does not support the EPS attach without PDN connectivity, the UE initiates a LTE attach procedure to the LTE network by transmitting an attach request message to the LTE network.

Figure 4:
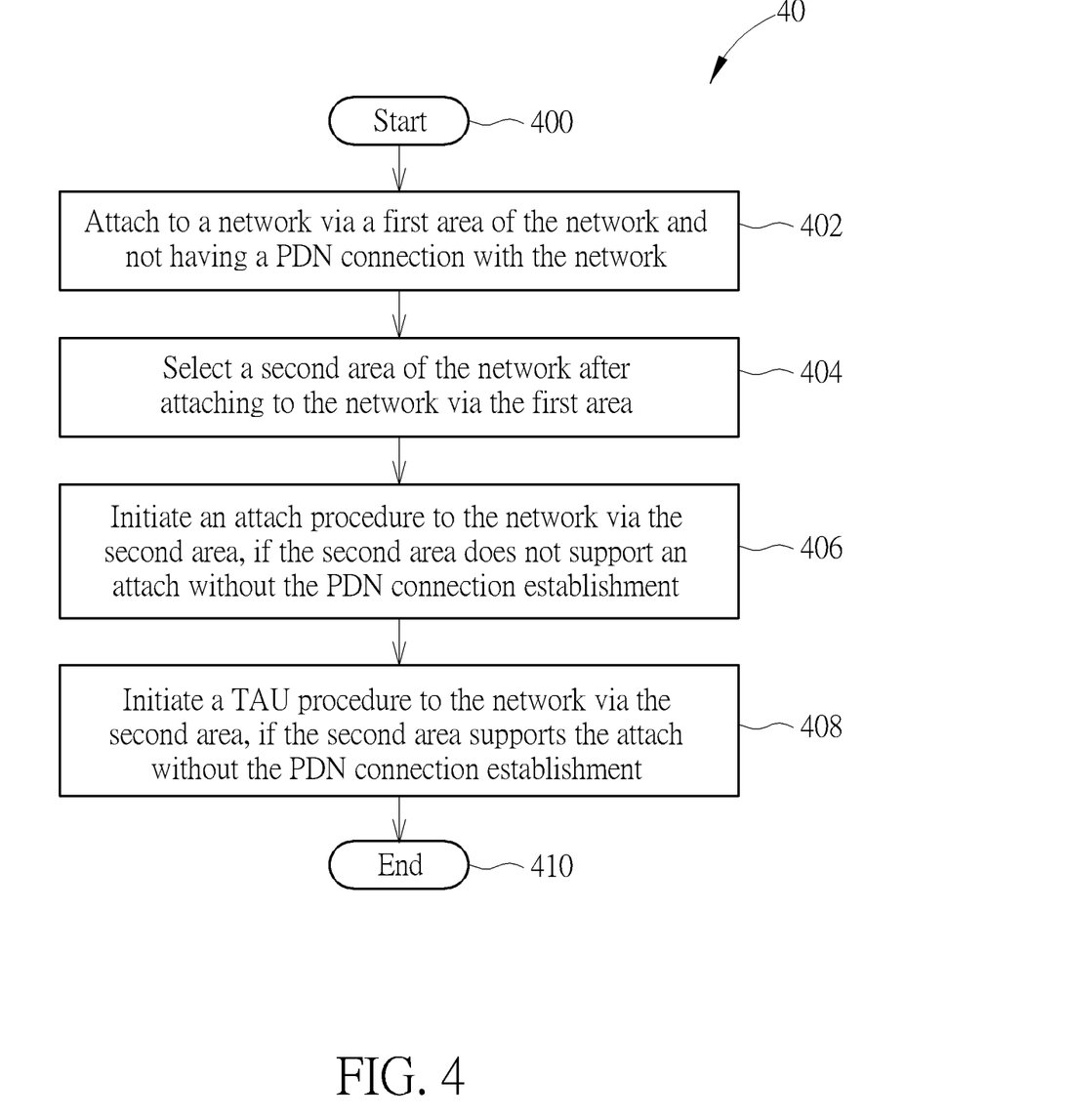
FIG. 4 is a flowchart of a process according to an example of the present invention.

FIG. 4 is a flowchart of a process 40 according to an example of the present invention. The process 40 can be utilized in the UE shown in FIG. 1, for handling mobility management. The process 40 includes the following steps:

Step 400: Start.

Step 402: Attach to a network via a first area of the network and not having a PDN connection with the network.

Step 404: Select a second area of the network after attaching to the network via the first area.

Step 406: Initiate an attach procedure to the network via the second area, if the second area does not support an attach without the PDN connection establishment.

Step 408: Initiate a TAU procedure to the network via the second area, if the second area supports the attach without the PDN connection establishment.

Step 410: End.

According to the process 40, the UE first attaches to a network via a first area of the network (e.g., the LTE network) and does not have a PDN connection with the network. After attaching to the network, the UE selects a second area of the network. The UE initiates an attach procedure to the network via the second area, if the second area does not support an attach without the PDN connection establishment. The UE initiates a TAU procedure to the network via the second area, if the second area supports the attach without the PDN connection establishment. In other words, the UE determines the attach procedure or the TAU procedure to be initiated according to whether the function of the attach without PDN connection establishment is supported by the second area (i.e., the selected area).

Realization of the process 40 is not limited to the above description. The following examples may be applied to the process 40.

In one example, the first area includes at least one first cell, and the second area includes at least one second cell. In one example, the first area and the second area are tracking areas (TAs) controlled by one or more MMEs in a LTE network. In one example, the first area and the second area may be TAs controlled by one or more 5G network nodes (e.g., 5G MMEs) in the 5G network.

In one example, the network may indicate to the UE that the second area supports or does not support the function of the attach without the PDN connection establishment in a broadcast signaling or a dedicated signaling. The UE initiates the TAU procedure when the broadcast signaling or the dedicated signaling indicates support of the function. The UE initiates the attach procedure when the broadcast signaling or the dedicated signaling indicates not support of the function. In one example, information related to the second area supporting the function or not may be stored in the UE. The UE initiates the TAU procedure when the information indicates support of the function. The UE initiates the attach procedure when the UE does not have the information indicating support of the function or the information indicates not support of the function.

An example is illustrated according to the process 40 as follows. The UE attaches to a LTE network by performing a LTE attach procedure to the LTE network via a cell of a first TA. The UE has no PDN connection when staying in the first TA. Then, the UE selects or reselects a cell of the second TA of the LTE network. The UE determines whether the second TA supports EPS attached without PDN connectivity (e.g., without the PDN connection establishment). If the UE determines that the second TA supports the EPS attach without PDN connectivity, the UE initiates a TAU procedure to the LTE network by transmitting a TAU request message to the LTE network via a cell of the second area. If the UE determines that the second TA does not support the EPS attach without PDN connectivity, the UE initiates a LTE attach procedure to the LTE network by transmitting an attach request message to the LTE network via the cell of the second area.

In one example, the processes 30 and 40 may be combined. The following examples may be applied to the processes 30 and 40.

In one example, the UE has no PDN connection in a UMTS/GPRS network. That is, the UE has no PDP context in the UMTS/GPRS network. In one example, the UE has no PDN connection in a LTE network. That is, the UE has no EPS bearer context (associated with a PDN connection). In one example, the UE has no PDN connection in a 5G network. That is, the UE has no 5G bearer context.

The attach without PDN connection establishment is a function (or functionality) which may be supported by the UE and/or the second network (i.e., the selected network). The second network may indicate to the UE that it supports the function in a broadcast signaling (e.g., system information) or a dedicated signaling (e.g., LTE Attach Accept, LTE TAU Accept, GPRS Attach Accept, GPRS routing area update accept and/or Radio Resource Control (RRC) connection setup message) via a cell. Thus, the UE may know whether the second network supports the function from the broadcast signaling or the dedicated signaling when the UE receives the broadcast signaling or the dedicated signaling.

In addition, the UE may store information related to one or more PLMNs supporting the function. The UE determines to use the attach procedure or the TAU procedure according to the information. The UE may store a PLMN identity of the second network and further store TA information (e.g., TA code) to know which TA supports the function. The PLMN identity and the TA information are broadcasted by the cell in system information. In one example, the UE may have a database stored in its storage unit. The database may include the information related to one or more PLMNs supporting the function. The UE receives a PLMN identity from the system information broadcasted by a cell of a network, and determines whether the network identified by the PLMN identity supports the functionality or not. The database may further include TA information. The UE receives a TA code from the system information, and determines whether the network identified by the PLMN identity and a TA of the network identified by the TA code support the function or not.

The processes 30 and 40 brings benefits that the UE without any established PDN connection can initiate the TAU procedure instead of initiating the attach procedure. Some signaling exchanges caused by the attach procedure are saved.

Figure 5:
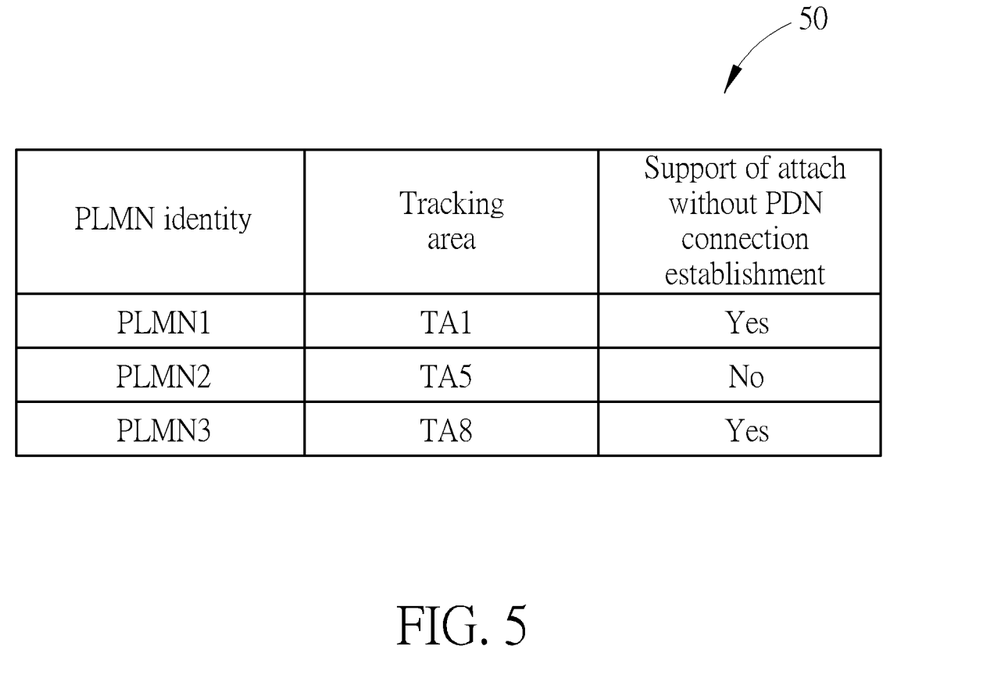
FIG. 5 is a table of support of attach without PDN connection establishment according to an example of the present invention.

FIG. 5 is a table 50 showing an example of the database stored in the UE. There are three PLMN identities PLMN1, PLMN2 and PLMN3 and corresponding TA codes TA1, TA5 and TA8 in the database. In one example, the UE receives the PLMN1 and the TA1 in system information broadcasted by a cell of a network. The UE determines that the network identified by the PLMN1 and the TA1 supports the function of the attach without PDN connection establishment according to the database. In one example, the UE receives the PLMN2 and the TA5 in the system information broadcasted by a cell of the network. The UE determines that the network identified by the PLMN2 and the TA5 does not support the function according to the database.

Figure 6:
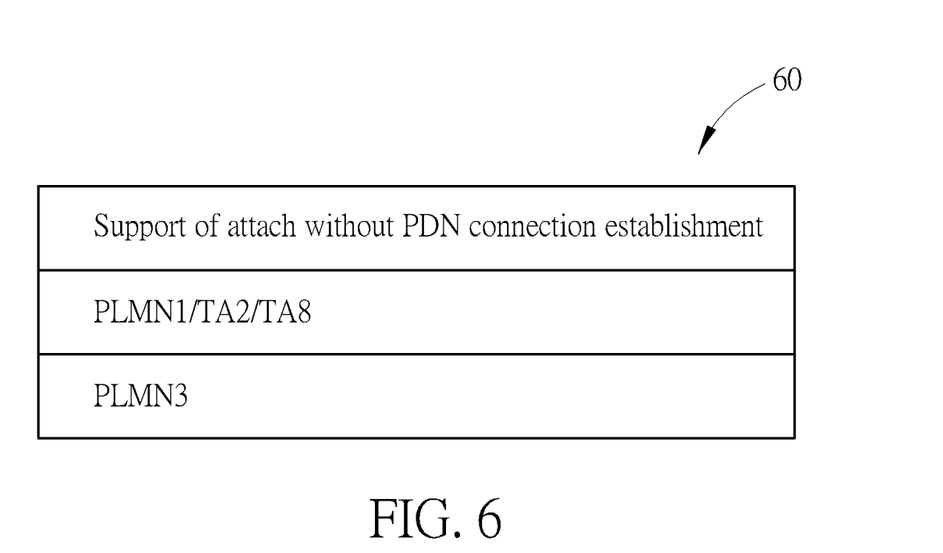
FIG. 6 is a table of support of attach without PDN connection establishment according to an example of the present invention.

FIG. 6 is a table 60 showing an example of the database stored in the UE. The database includes PLMN identities and/or corresponding TAs that support attach without PDN connection establishment. There are two PLMN identities PLMN1 and PLMN3, wherein the PLMN identity PLMN1 is corresponding to TA codes TA2 and TA8. In one example, the UE may receive the PLMN1 in system information broadcasted by a cell of a network. The UE determines that the network identified by the PLMN1 and the TA2 and TA8 supports the function of the attach without PDN connection establishment according to the database. In one example, the UE receives the PLMN3 in the system information broadcasted by a cell of a network. The UE determines that the network identified by all the TAs in the network supports the functionality of the attach without PDN connection establishment according to the database.

It should be noted that parameters for identifying the function of the attach without PDN connection establishment are not limited to those in the tables 50 and 60. For example, the TA information may or may not exist in the tables 50 and 60.

Figure 7:
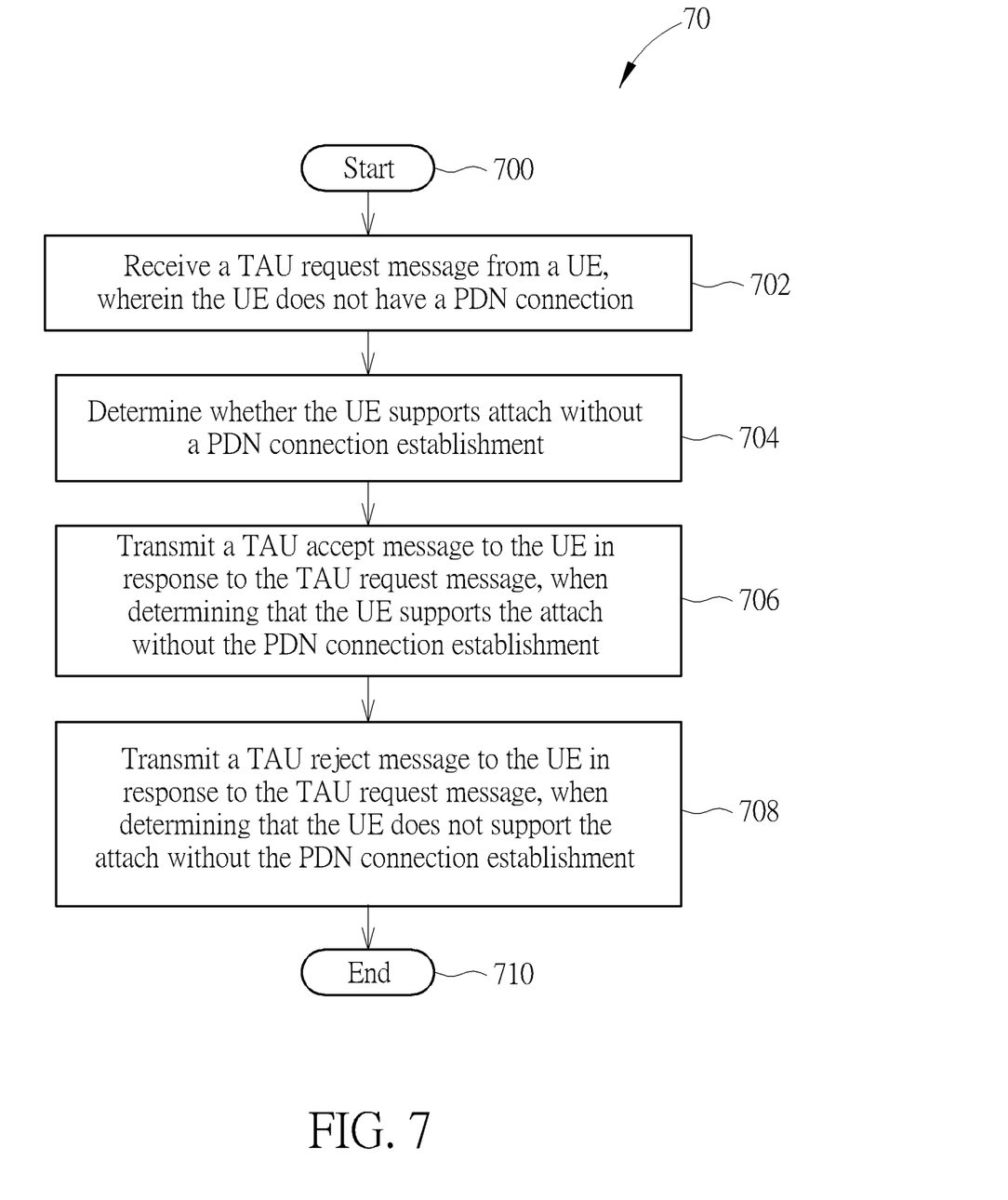
FIG. 7 is a flowchart of a process according to an example of the present invention.

FIG. 7 is a flowchart of a process 70 according to an example of the present invention. The process 70 can be utilized in a first network shown in FIG. 1, for handling mobility management. The process 70 includes the following steps:

Step 700: Start.

Step 702: Receive a TAU request message from a UE, wherein the UE does not have a PDN connection.

Step 704: Determine whether the UE supports attach without a PDN connection establishment.

Step 706: Transmit a TAU accept message to the UE in response to the TAU request message, when determining that the UE supports the attach without the PDN connection establishment.

Step 708: Transmit a TAU reject message to the UE in response to the TAU request message, when determining that the UE does not support the attach without the PDN connection establishment.

Step 710: End.

According to the process 70, the first network first receives a TAU request message from a UE, wherein the UE does not have a PDN connection. Then, the first network determines whether the UE supports attach without a PDN connection establishment. The first network transmits a TAU accept message to the UE in response to the TAU request message when determining that the UE supports the attach without the PDN connection establishment. The first network transmits a TAU reject message to the UE in response to the TAU request message when determining that the UE does not support the attach without the PDN connection establishment.

Realization of the process 70 is not limited to the above description. The following examples may be applied to the process 70.

In one example, the first network includes a LTE network, and the second network includes a UMTS network. In one example, the first network includes a 5G network, and the second network includes a LTE network.

In one example, the TAU request message may include an indication of the attach without the PDN connection establishment which indicates the UE supporting the attach without the PDN connection establishment to the network. If the TAU request does not include the indication, the network knows the UE does not support the function. Thus, the first network is able to determine whether the UE supports the attach without PDN connection establishment or not according to the TAU request.

The following examples may be applied to the processes 30, 40 and/or 70.

In one example, the PDN connection may be an association between a UE represented by one Internet Protocol version 4 address and/or one Internet Protocol version 6 prefix and a PDN represented by an access point name. In one example, the TAU request message may indicate no EPS or 5G bearer context.

Those skilled in the art should readily make combinations, modifications and/or alterations on the abovementioned description and examples. Any of the abovementioned processes may be compiled into the program code 214. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the UE 20.

To sum up, the present invention provides a device and a method for handling mobility management. A communication device reduces overheads caused by the mobility management by dynamically selecting an attach procedure or a TAU procedure. Thus, the problem in the art is solved.

Those skilled in the art will readily observe that numerous modifications and alterations of the device and method may be made while retaining the teachings of the invention. Accordingly, the above disclosure should be construed as limited only by the metes and bounds of the appended claims

What is claimed is:

1. A user equipment for handling mobility management, comprising:
   a storage unit, for storing instructions of:
   attaching to a first network and not having a Packet Data Network (PDN) connection with the first network;
   selecting a second network after attaching to the first network and not having the PDN connection with the first network;
   determining whether the second network supports an attach without the PDN connection establishment by receiving a broadcast signaling from the second network;
   initiating an attach procedure to the second network, if the broadcast signaling indicates that the second network does not support the attach without the PDN connection establishment; and
   initiating a tracking area update (TAU) procedure to the second network, if the broadcast signaling indicates that the second network supports the attach without the PDN connection establishment; and
   a processing circuit, coupled to the storage unit, configured to execute the instructions stored in the storage unit.

2. The user equipment of claim 1, wherein the first network comprises a LTE network, and the second network comprises a fifth generation (5G) network.

3. The user equipment of claim 1, wherein information related to the second network supporting the attach without the PDN connection establishment is stored in the communication device.

4. A user equipment for handling mobility management, comprising:
   a storage unit, for storing instructions of:
   attaching to a network via a first area of the network and not having a Packet Data Network (PDN) connection with the network;
   selecting a second area of the network after attaching to the network via the first area;
   determining whether the second area supports an attach without the PDN connection establishment;
   initiating an attach procedure to the network via the second area, if the second area does not support the attach without the PDN connection establishment; and
   initiating a tracking area update (TAU) procedure to the network via the second area, if the second area supports the attach without the PDN connection establishment; and
   a processing circuit, coupled to the storage unit, configured to execute the instructions stored in the storage unit.

5. The user equipment of claim 4, wherein the first area and the second area are tracking areas controlled by at least one mobility management entities (MMES) in a long-term evolution (LTE) network.

6. The user equipment of claim 4, wherein the first area and the second area are tracking areas controlled by at least one fifth generation (5G) network nodes in a 5G network.

7. The user equipment of claim 4, wherein information related to the second area supporting the attach without the PDN connection establishment is stored in the communication device.

8. A first network for handling mobility management, comprising:
   a storage unit, for storing instructions of:
   receiving a tracking area update (TAU) request message from a user equipment which moves from a second network to the first network, wherein the user equipment does not have a Packet Data Network (PDN) connection with the second network;
determining whether the user equipment supports an attach without a PDN connection establishment;
transmitting a TAU accept message to the user equipment in response to the TAU request message, when determining that the user equipment supports the attach without the PDN connection establishment; and
transmitting a TAU reject message to user equipment in response to the TAU request message, when determining that the user equipment does not support the attach without the PDN connection establishment; and
a processing circuit, coupled to the storage unit, configured to execute the instructions stored in the storage unit.

9. The first network of claim 8, wherein the first network comprises a long-term evolution (LTE) network, and the second network comprises an universal mobile telecommunication system (UMTS) network.

10. The first network of claim 8, wherein the first network comprises a fifth generation (5G) network, and the second network comprises a LTE network.

11. The first network of claim 8, wherein the TAU request message indicates a support of the attach without the PDN connection establishment.

12. The first network of claim 8, wherein the PDN connection is an association between the user equipment represented by an Internet Protocol version 4 address and/or an Internet Protocol version 6 prefix and a PDN represented by an access point name.

13. The first network of claim 8, wherein the TAU request message indicates no bearer context.

* * * * *

UNITED STATES PATENT AND TRADEMARK OFFICE
CERTIFICATE OF CORRECTION

PATENT NO.         : 10,568,012 B2
APPLICATION NO.    : 15/473589
DATED              : February 18, 2020
INVENTOR(S)        : Chih-Hsiang Wu

Page 1 of 1

It is certified that error appears in the above-identified patent and that said Letters Patent is hereby corrected as shown below:

In the Claims

In Column 8, Line 30, replace the words "communication device" with --user equipment-- in Claim 3.
In Column 8, Line 61, replace the words "communication device" with --user equipment-- in Claim 7.

Signed and Sealed this
Seventeenth Day of March, 2020

Andrei Iancu
*Director of the United States Patent and Trademark Office*